United States Patent
Toyama

[11] Patent Number: 5,666,232
[45] Date of Patent: Sep. 9, 1997

[54] THREE-GROUP ZOOM LENS

[75] Inventor: Nobuaki Toyama, Omiya, Japan

[73] Assignee: Fuji Photo Optical Co. Ltd., Omiya, Japan

[21] Appl. No.: 688,024

[22] Filed: Jul. 29, 1996

[30] Foreign Application Priority Data

Oct. 5, 1995 [JP] Japan .................. 7-284552

[51] Int. Cl.$^6$ ................................. G02B 15/14
[52] U.S. Cl. ................................. 359/689
[58] Field of Search ..................... 359/683, 689

[56] References Cited

U.S. PATENT DOCUMENTS

| | | | |
|---|---|---|---|
| 5,042,926 | 8/1991 | Kikuchi | 359/689 |
| 5,539,582 | 7/1996 | Kohno et al. | 359/689 |
| 5,574,599 | 11/1996 | Hoshi et al. | 359/689 |

FOREIGN PATENT DOCUMENTS 5-69209  1/1993  Japan .

*Primary Examiner*—Scott J. Sugarman
*Attorney, Agent, or Firm*—Ronald R. Snider

[57] ABSTRACT

While the third lens group is made stationary when varying power, a stop is disposed in the third lens group so as to suppress change in $F_{NO}$ when varying power. A zoom lens comprises, successively from the object side, a first lens group ($G_1$) which is negative as a whole, a second lens group ($G_2$) which is positive as a whole, and a third lens group ($G_3$) which is negative as a whole. At the time of zooming, the third lens group ($G_3$) is made stationary while the first lens group ($G_1$) and the second lens group ($G_2$) are made movable. As the two lens groups ($G_1$ and $G_2$) are moved along the optical axis (X), the focal length (f) of the whole system is changed, while a luminous flux is efficiently focused onto the imaging surface (2). A stop (1) is disposed in the stationary third lens group ($G_3$). The zoom lens is configured so as to satisfy the following seven conditional expressions:

(1) $-1.3 < G_1/f_w < -1.0$
(2) $0.4 < G_2/f_w < 0.7$
(3) $-4.8 < G_3/f_w < -1.0$
(4) $1.0 < G_{1R}/f_w < 3.0$
(5) $0.7 < G_{2F}/f_w < 1.9$
(6) $8.5 < R_{2R}/f_w < -2.7$
(7) $-1.2 < R_{3F}/f_w < -0.3$ wherein $f_w$ is focal length at a wide angle end; $G_1$ is focal length of the first lens group; $G_2$ is focal length of the second lens group; $G_3$ is focal length of the third lens group; $G_{1R}$ is focal length of a lens closest to an imaging surface side in the first lens group; $G_{2F}$ is focal length of a lens closest to the object side in the second lens group, $R_{2R}$ is radius of curvature, on the imaging surface side, of a lens closest to the imaging surface side in the second lens group; and $R_{3F}$ is radius of curvature, on the object side, of a lens closest to the object side in the third lens group.

1 Claim, 12 Drawing Sheets

THREE-GROUP ZOOM LENS

RELATED APPLICATIONS

This application claims the priority of Japanese Patent Application No. 7-284552 filed on Oct. 5, 1995, which is incorporated herein by reference.

BACKGROUND OF THE INVENTION

1. Field of the Invention

The present invention relates to a zoom lens composed of three groups and, in particular, to a three-group zoom lens used in cameras for ID photographs and the like.

2. Description of the Prior Art

There have conventionally been known three-group zoom lenses which have a higher degree of freedom in aberration correction as compared with two-group zoom lenses, whereby various kinds of aberration such as spherical aberration and chromatic aberration can be made favorable.

There has been known, for example, a three-group zoom lens such as that disclosed in Japanese Patent Publication No. 5-69209 comprising, successively from the object side, a negative first lens group, a positive second lens group, and a negative third lens group, in which the first and second lens groups are moved at the time of varying power, so as to achieve a so-called negative lead type three-group configuration, thereby attaining a wide angle in terms of photographing field angle, while favorably correcting aberration.

In the prior art disclosed in the above-mentioned publication, however, since a stop is disposed within the second lens group, this stop moves together with the other lenses in the second lens group at the time of varying power. Accordingly, $F_{NO}$ fluctuates at the time of varying power unless the diameter of the stop is changed. In general, it is unfavorable for $F_{NO}$ to change greatly at the time of variable power. In particular, in instant cameras for ID photographs or the like, since latitude is narrow therein, it is preferable that change in $F_{NO}$ at the time of varying power be suppressed as much as possible.

SUMMARY OF THE INVENTION

In view of such a circumstance, the object of the present invention is to provide a three-group zoom lens which can suppress the change in $F_{NO}$ at the time of varying power without changing the diameter of a stop.

The three-group zoom lens in accordance with the present invention comprises, successively from the object side, a negative first lens group, a positive second lens group, and a negative third lens group;

wherein, during varying power, the third lens group is made stationary while the first lens group and the second lens group are moved;

wherein a stop is disposed in the third lens group; and wherein the following conditional expressions (1) to (7) are satisfied:

(1) $-1.3 < G_1/f_w < -1.0$
(2) $0.4 < G_2/f_w < 0.7$
(3) $-4.8 < G_3/f_w < -1.0$
(4) $1.0 < G_{1R}/f_w < 3.0$
(5) $0.7 < G_{2F}/f_w < 1.9$
(6) $-8.5 < R_{2R}/f_w < -2.7$
(7) $-1.2 < R_{3F}/f_w < -0.3$ wherein $f_w$ is the focal length at the wide angle end;

$G_1$ is the focal length of the first lens group;

$G_2$ is the focal length of the second lens group;

$G_3$ is the focal length of the third lens group;

$G_{1R}$ is the focal length of the lens closest to the imaging surface side in the first lens group;

$G_{2F}$ is the focal length of the lens closest to the object side in the second lens group;

$R_{2R}$ is the radius of curvature, on the imaging surface side, of the lens closest to the imaging surface side in the second lens group; and $R_{3F}$ is the radius of curvature, on the object side, of the lens closest to the object side in the third lens group.

DETAILED DESCRIPTION OF THE PREFERRED EMBODIMENTS

In the following, embodiments of the present invention will be explained with reference to drawings. While three embodiments will be specifically explained in the following, elements identical to each other will be referred to with marks identical to each other in the explanation of the drawings respectively corresponding to the embodiments, without their overlapping explanations being repeated. Also, the arrows in the drawings indicate loci of lens groups $G_1$, $G_2$, and $G_3$ during when the zoom lens proceeds from the wide angle end to the telephoto end.

Embodiment 1

Figure 1:
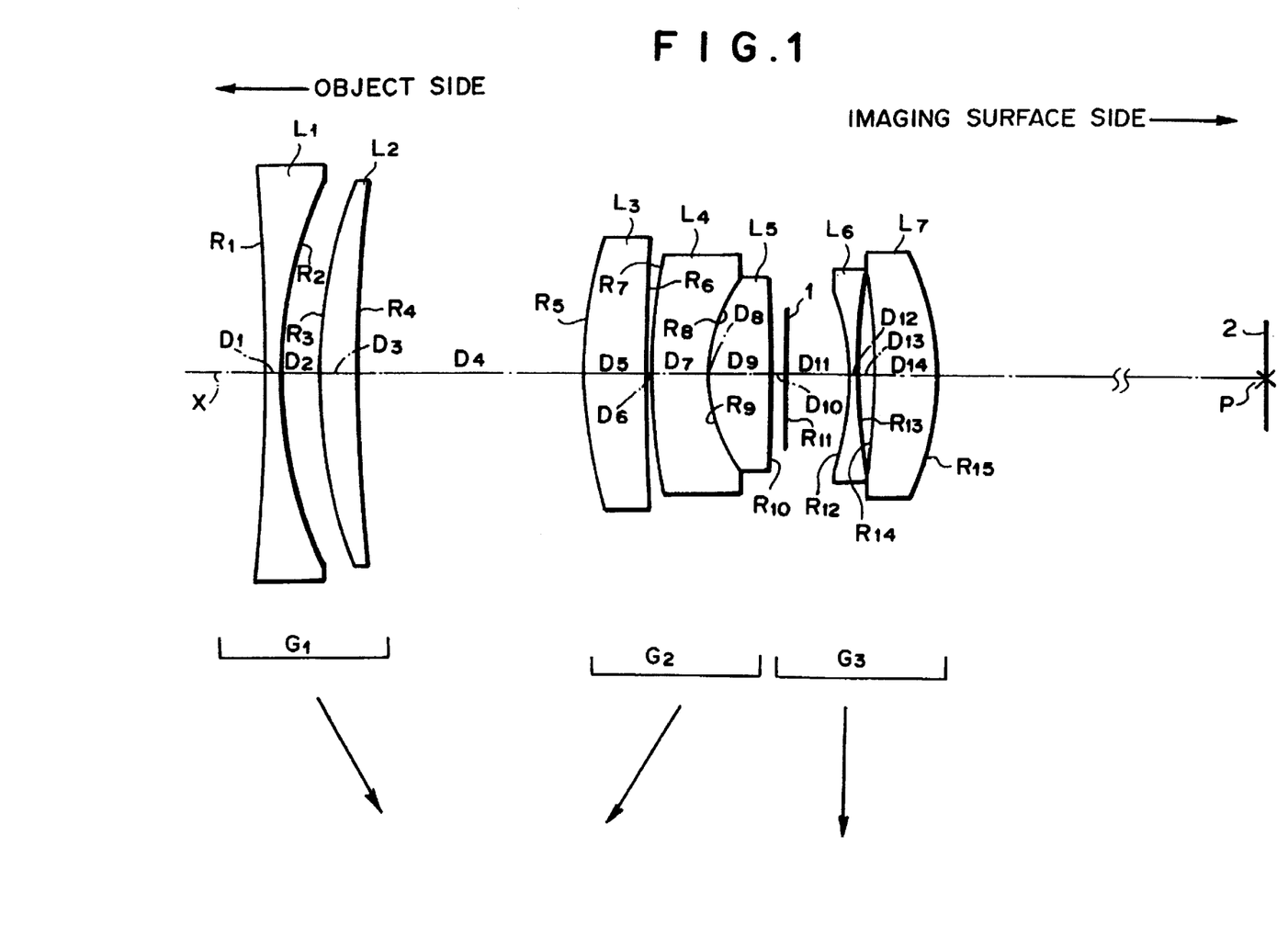
FIG. 1 is a schematic view showing a basic lens configuration in accordance with Embodiment 1 of the present invention.

The three-group zoom lens of Embodiment 1 shown in FIG. 1 comprises, successively from the object side, a first lens group $G_1$ having a negative refractive power as a whole, a second lens group $G_2$ having a positive refractive power as a whole, and a third lens group $G_3$ having a negative refractive power as a whole. At the time of zooming, the third lens group $G_3$ is made stationary while the first lens group $G_1$ and the second lens group $G_2$ are made movable. As these two lens groups $G_1$ and $G_2$ are moved along an optical axis X, focal length f of the whole system is changed, while a luminous flux can be efficiently focused onto an imaging surface 2. This zoom lens is configured so as to satisfy the following conditional expressions (1) to (7):

(1) $-1.3 < G_1/f_w < -1.0$ (2) $0.4 < G_2/f_w < 0.7$ (3) $-4.8 < G_3/f_w < -1.0$ (4) $1.0 < G_{1R}/f_w < 3.0$ (5) $0.7 < G_{2F}/f_w < 1.9$ (6) $-8.5 < R_{2R}/f_w < -2.7$ (7) $-1.2 < R_{3F}/f_w < -0.3$ wherein $f_w$ is the focal length at the wide angle end;

$G_1$ is the focal length of the first lens group;

$G_2$ is the focal length of the second lens group;

$G_3$ is the focal length of the third lens group;

$G_{1R}$ is the focal length of the lens closest to the imaging surface side in the first lens group;

$G_{2F}$ is the focal length of the lens closest to the object side in the second lens group;

$R_{2R}$ is the radius of curvature, on the imaging surface side, of the lens closest to the imaging surface side in the second lens group; and $R_{3F}$ is the radius of curvature, on the object side, of the lens closest to the object side in the third lens group.

Further, more specifically, the first lens group $G_1$ comprises a negative lens $L_1$ and a positive lens $L_2$; the second lens group $G_2$ comprises lenses $L_3$ to $L_5$ which are respectively positive, negative, and positive; and the third lens group $G_3$ comprises a stop 1, a negative lens $L_6$, and a positive lens $L_7$.

Namely, the zoom lens of this embodiment attains a so-called negative lead type in which the first lens group $G_1$ has a negative refractive power such that the lens group having a negative refractive power takes the lead, thereby achieving a zoom lens having a wide field angle.

Further, the second lens group $G_2$ has a positive refractive power so as to effectively focus a divergent luminous flux from the first lens group $G_1$. Here, in order to favorably correct various kinds of aberration generated in the second lens group $G_2$, it is constituted by a triplet form made of three lenses $L_3$ to $L_5$ which are respectively positive, negative, and positive.

Here, the third lens group $G_3$ is constituted by the stop 1 and two lenses $L_6$ and $L_7$, which are respectively negative and positive, while being made stationary even during zooming as mentioned above. Accordingly, the stop 1 is always stationary even during the time of zooming, whereby a system with no change in $F_{NO}$ can be attained.

Thus, as the zoom system of this embodiment is made as a system in which $F_{NO}$ does not change during zooming, it is particularly useful when employed in an instant camera or the like having a narrow latitude.

In the following, technical significance of each of the above-mentioned expressions (1) to (7) will be explained.

Namely, beyond the upper limit of conditional expression (1), coma becomes so large that correction is difficult. Below the lower limit, by contrast, spherical aberration and image surface curvature become so large that it is difficult to correct them in a balanced manner.

Beyond the upper limit of conditional expression (2), spherical aberration and image surface curvature become so large that correction is difficult. Below the lower limit, on the other hand, coma increases to the extent that it cannot be corrected any more.

Beyond the upper limit of conditional expression (3), coma and astigmatism become so large that correction is difficult. Below the lower limit, by contrast, spherical aberration and image surface curvature become so large that correction is difficult.

When the ranges of conditional expressions (4) and (5) are exceeded, distortion and spherical aberration become so large that it is difficult to correct them in a balanced manner.

Beyond the upper limit of conditional expression (6), coma and image surface curvature become so large that correction is difficult. Beyond the lower limit, by contrast, spherical aberration becomes so large that correction is difficult.

Beyond the upper limit of conditional expression (7), coma and image surface curvature become so large that correction is difficult. Below the lower limit, by contrast, spherical aberration becomes so large that correction is difficult.

Table 1 (follows) shows radius of curvature R (mm) of each lens surface, center thickness of each lens and air gap between neighboring lenses (collectively referred to as "axial spacing" hereinafter) D (mm), and refractive index N and Abbe number ν of each lens at d-line in the zoom lens in accordance with this embodiment.

Here (and also in Tables 3 and 5), the reference numbers in the table successively increase from the object side.

Also, Table 2 (follows) shows values of $D_4$ and $D_{10}$ in the column for the axial spacing D in Table 1 and $F_{NO}$ at each position of the wide angle end (f=142.79 mm), medium range (f=167.29 mm), and telephoto end (f=196.00 mm).

Figure 4A:
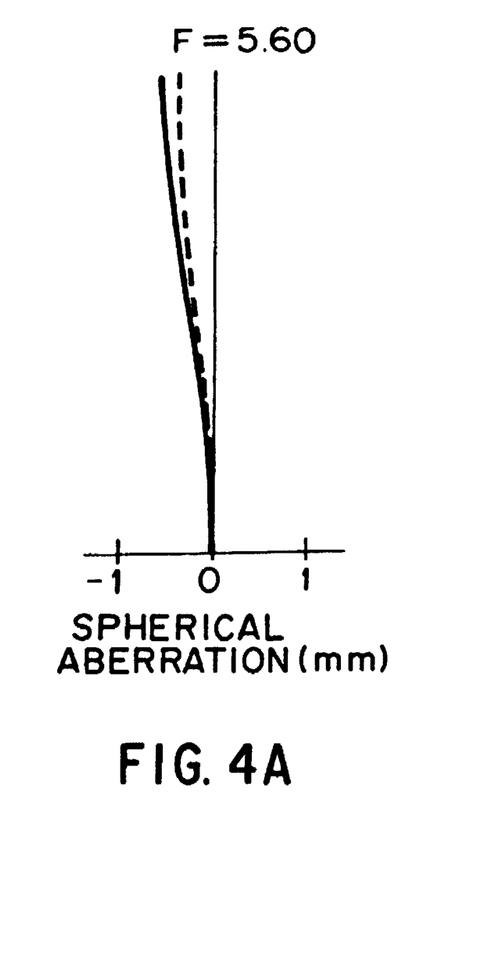
FIG. 4 is an aberration chart of the lens in accordance with Embodiment 1 at its wide angle end.
Figure 4B:
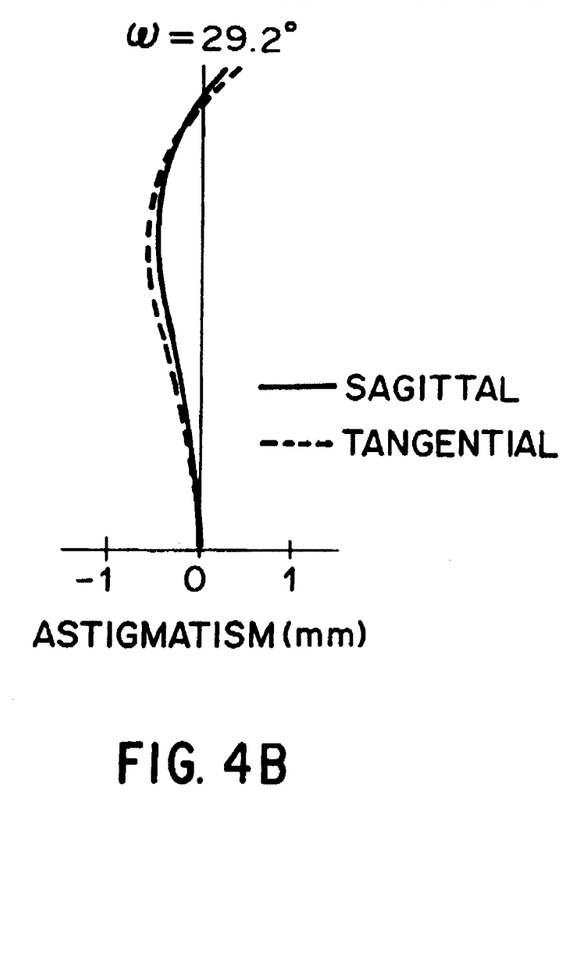
Figure 4C:
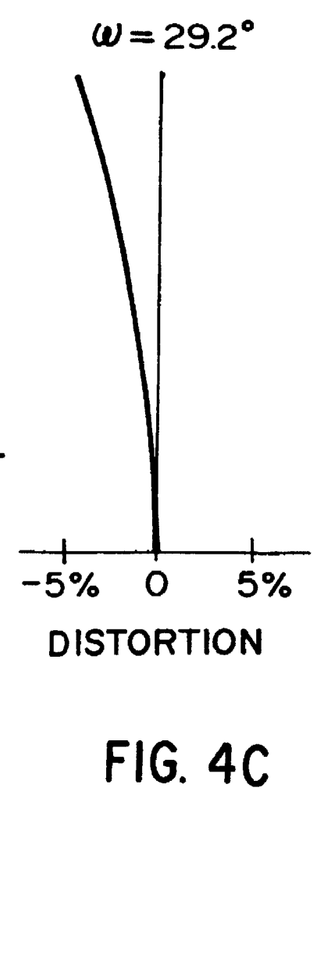
Figure 5A:
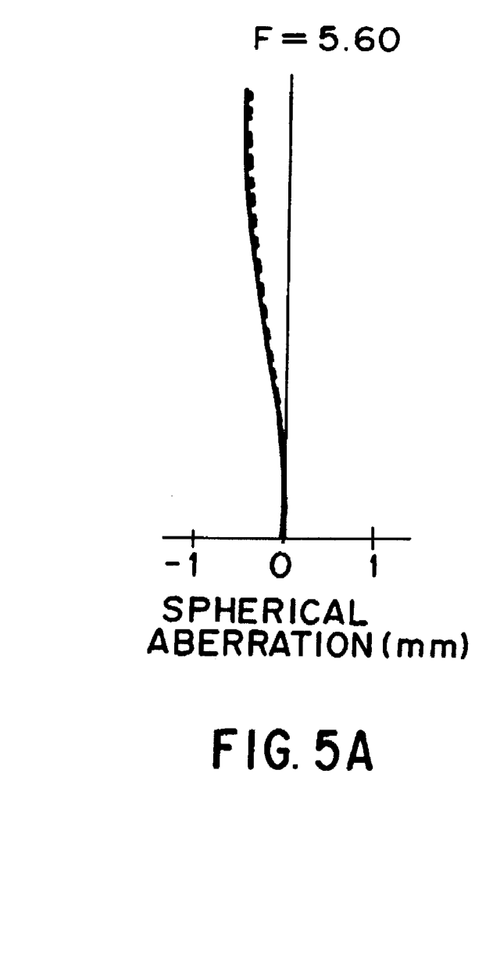
FIG. 5 is an aberration chart of the lens in accordance with Embodiment 1 at its medium range.
Figure 5B:
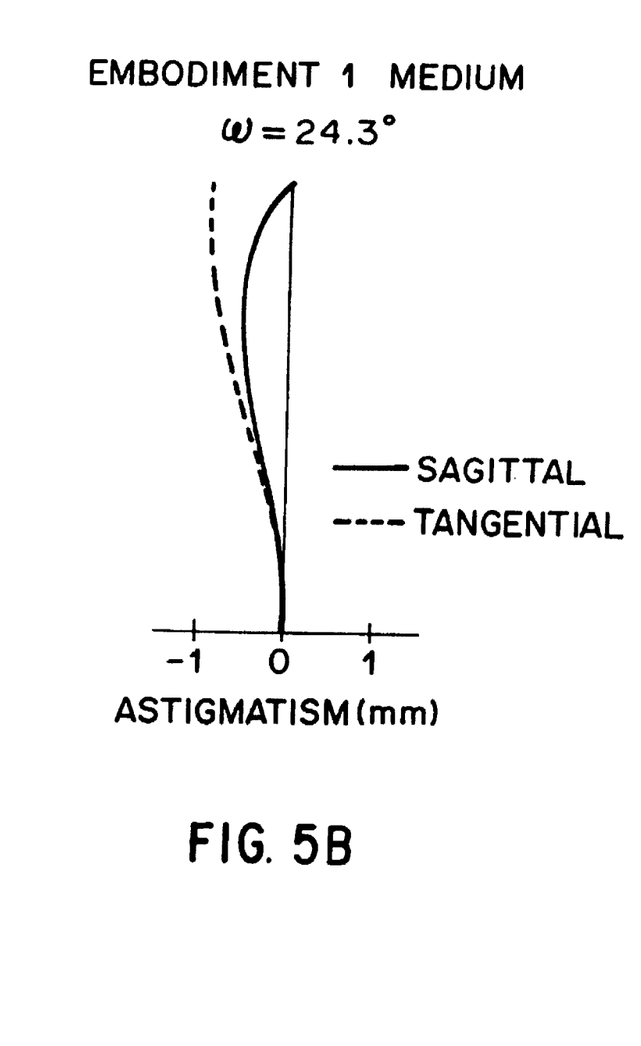
Figure 5C:
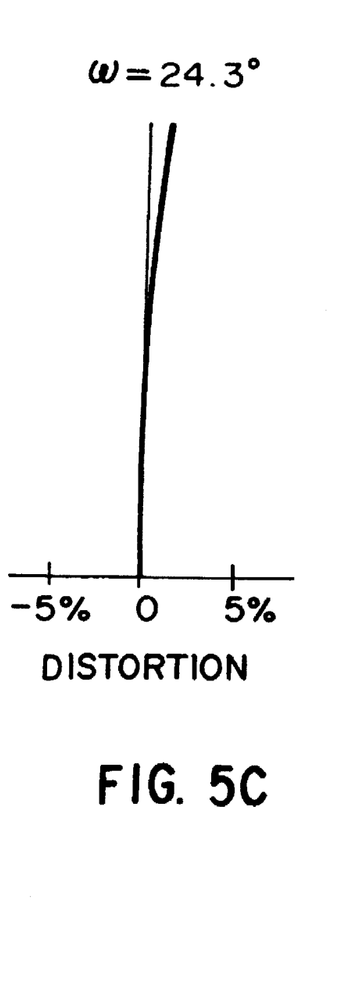
Figure 6A:
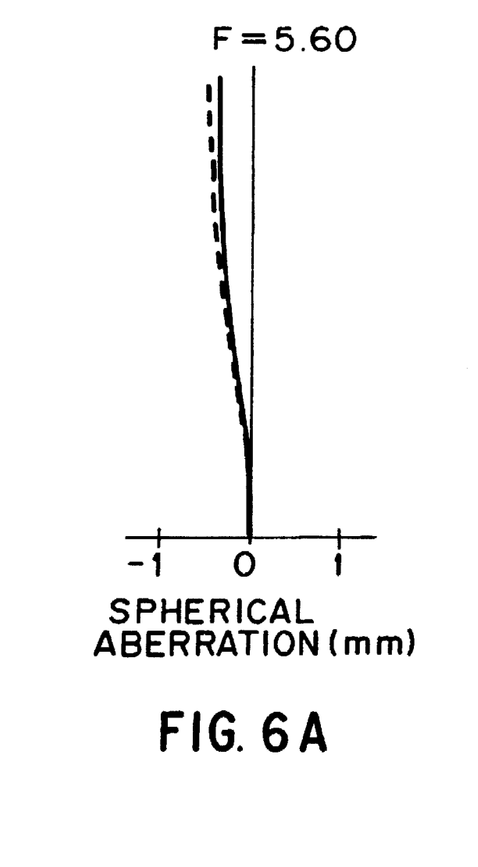
FIG. 6 is an aberration chart of the lens in accordance with Embodiment 1 at its telephoto end.
Figure 6B:
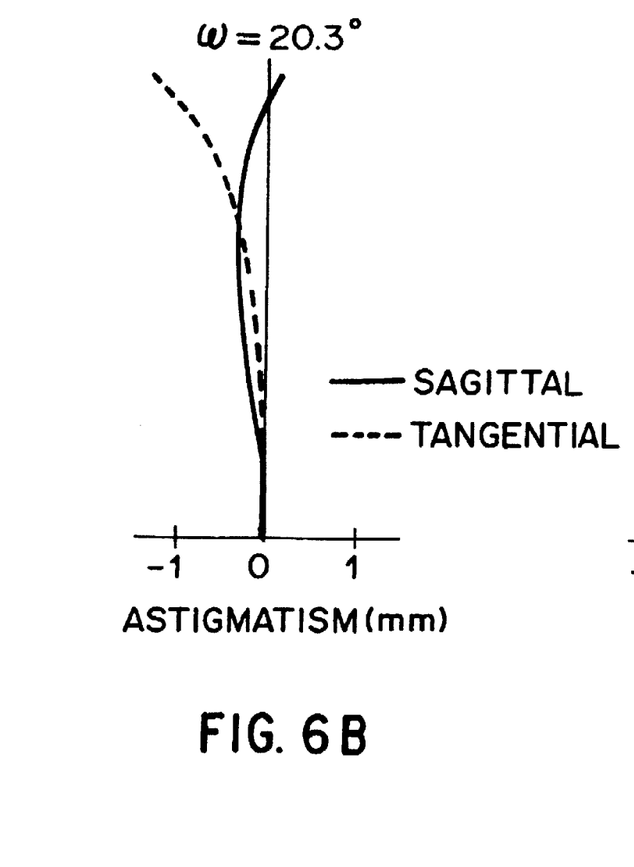
Figure 6C:
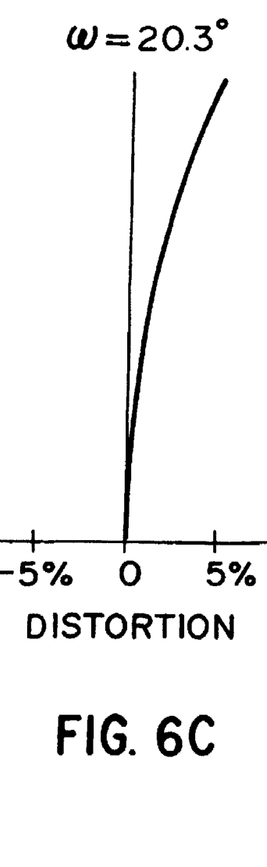

FIGS. 4, 5, and 6 are aberration charts showing various kinds of aberration (spherical aberration, astigmatism, and distortion) of the zoom lens of this embodiment at the wide angle end, medium range, and telephoto end, respectively. Here, for each spherical aberration chart, continuous curve and broken curve show spherical aberration and sine condition, respectively. Further, for each astigmatism chart, the respective aberrations with respect to the sagittal (S) image surface and the tangential (T) image surface are shown. (These also apply to FIGS. 7 to 12.) As can be seen from FIGS. 4 to 6 and the above-mentioned Table 2, in accordance with the zoom lens of this embodiment, aberration can be favorably corrected throughout the zoom area, a wider angle (2ω=58.4 degrees) can be attained, and $F_{NO}$ during zooming can be made constant.

Here, all the above-mentioned conditional expressions (1) to (7) are satisfied, while respective values are set as shown in Table 7 (follows).

Embodiment 2

Figure 2:
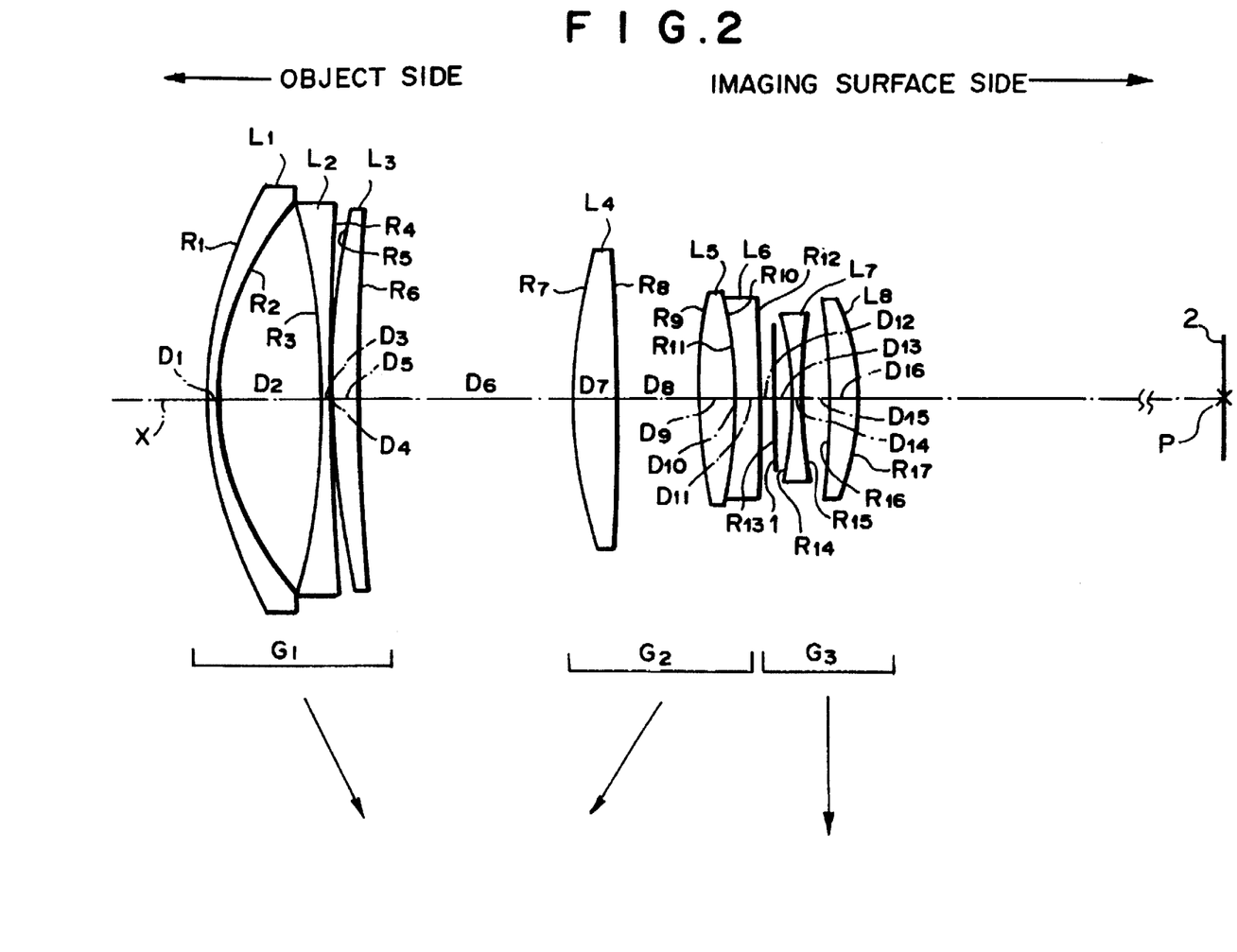
FIG. 2 is a schematic view showing a basic lens configuration in accordance with Embodiment 2 of the present invention.

In the following, the three-group lens of Embodiment 2 will be explained with reference to FIG. 2.

The lens of this embodiment has substantially the same lens configuration as that of the above-mentioned Embodiment 1 but mainly differs therefrom in that the first lens group $G_1$ is constituted by three lenses $L_1$ to $L_3$ which are respectively negative, negative, and positive and that the second lens group $G_2$ is constituted by three lenses $L_4$ to $L_6$ which are respectively positive, positive, and negative.

Table 3 (follows) shows radius of curvature R (mm) of each lens surface, center thickness of each lens and air gap between neighboring lenses D (mm), and refractive index N and Abbe number ν of each lens at d-line in the zoom lens in accordance with this embodiment.

Also, Table 4 (follows) shows values of $D_6$ and $D_{12}$ in the column for the axial spacing D in Table 3 and $F_{NO}$ at each position of the wide angle end (f=142.10 mm), medium range (f=166.48 mm), and telephoto end (f=195.04 mm).

Figure 7A:
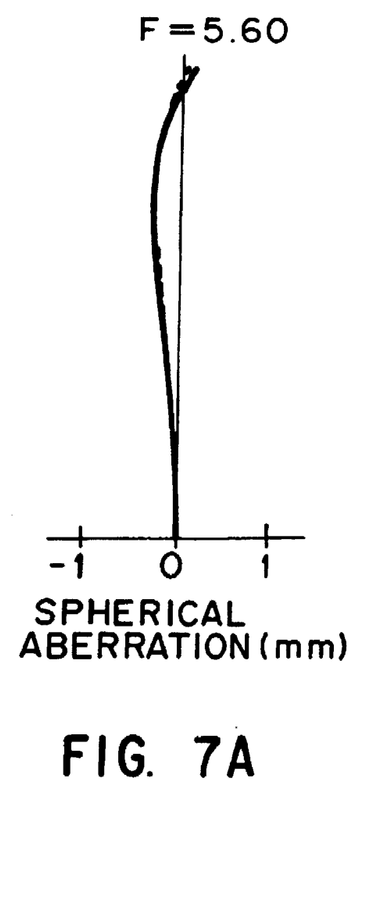
FIG. 7 is an aberration chart of the lens in accordance with Embodiment 2 at its wide angle end.
Figure 7B:
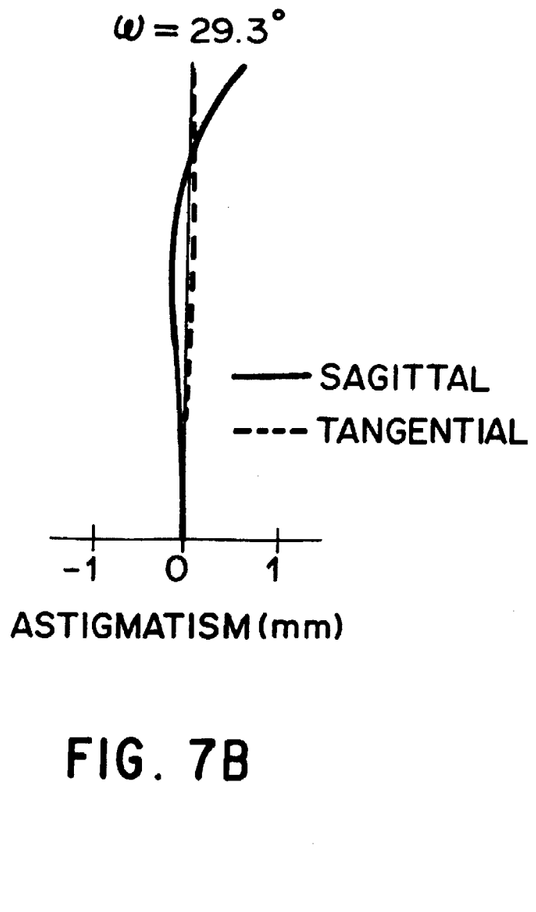
Figure 7C:
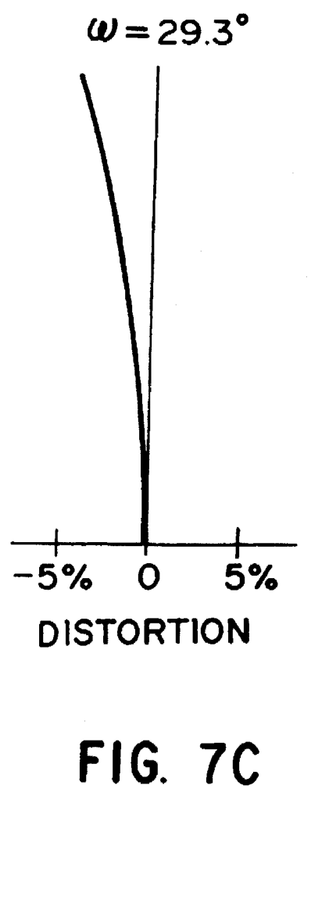
Figure 8A:
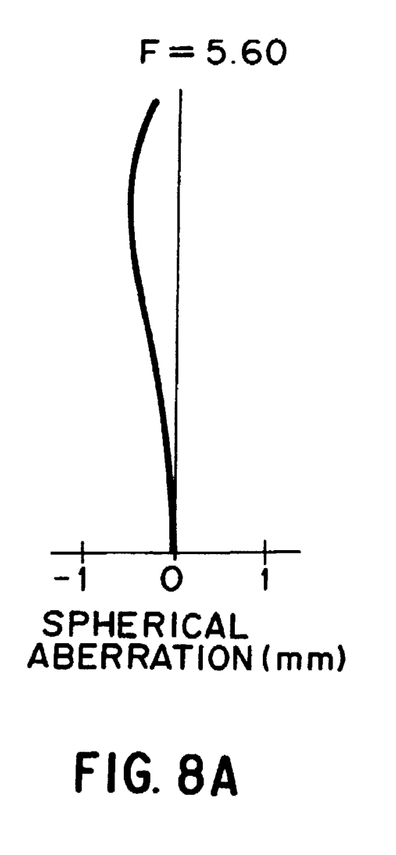
FIG. 8 is an aberration chart of the lens in accordance with Embodiment 2 at its medium range.
Figure 8B:
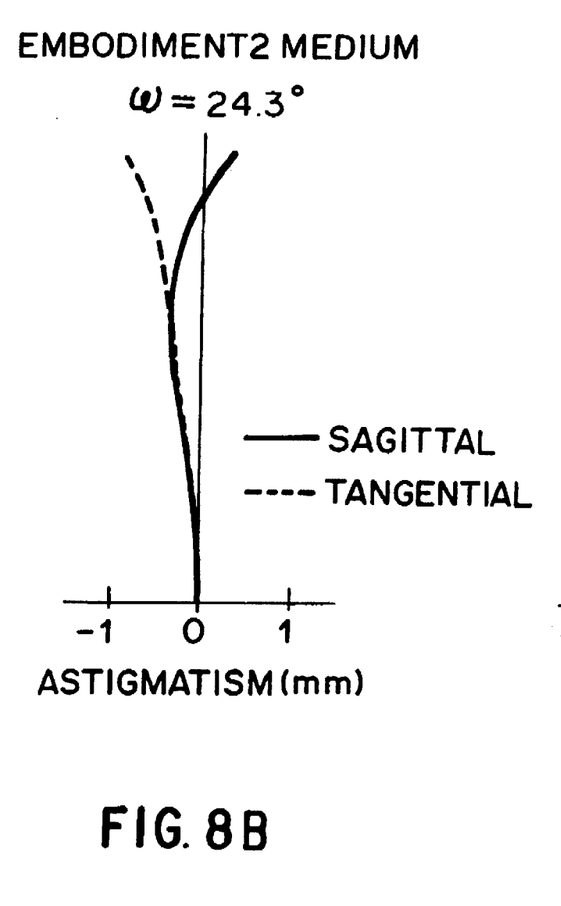
Figure 8C:
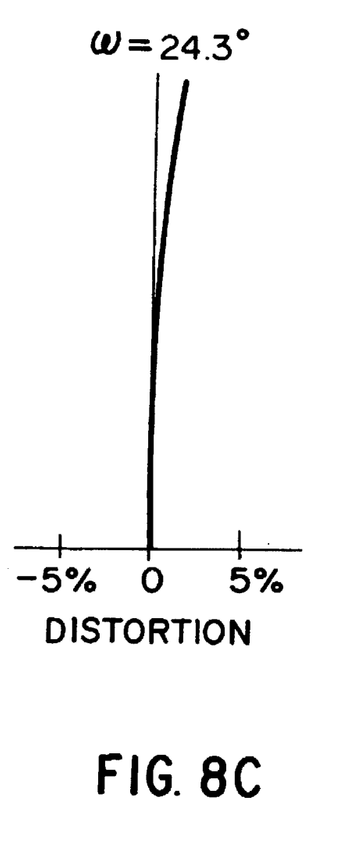
Figure 9A:
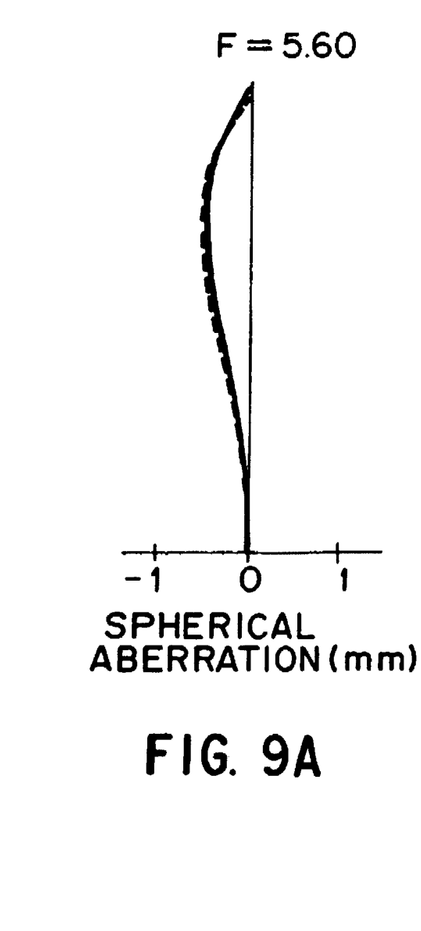
FIG. 9 is an aberration chart of the lens in accordance with Embodiment 2 at its telephoto end.
Figure 9B:
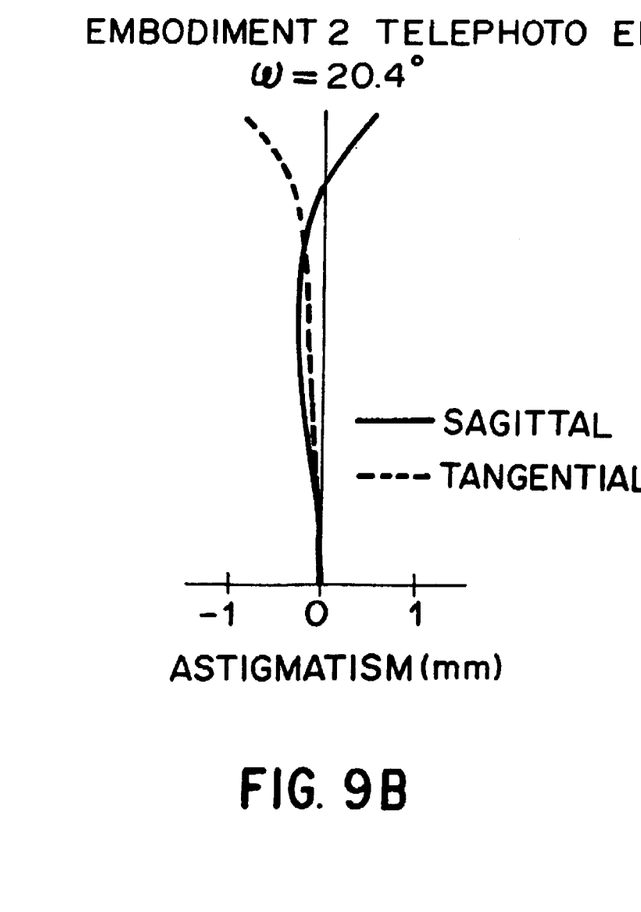
Figure 9C:
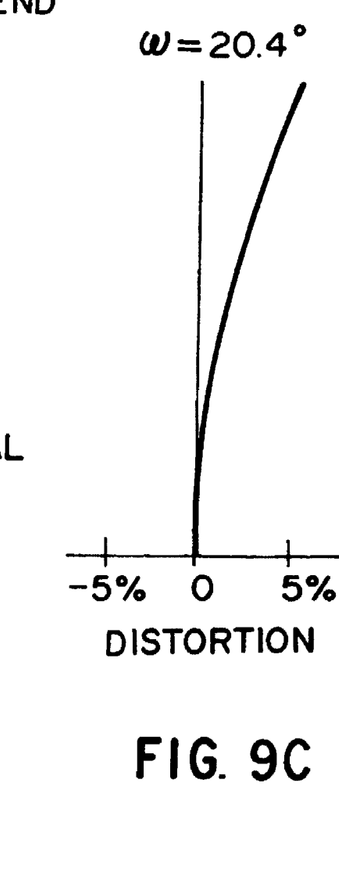

FIGS. 7, 8, and 9 are aberration charts showing various kinds of aberration of the zoom lens of this embodiment at the wide angle end, medium range, and telephoto end, respectively. As can be seen from FIGS. 7 to 9 and the above-mentioned Table 4, in accordance with the zoom lens of this embodiment, aberration can be favorably corrected throughout the zoom area, a wider angle (2ω=58.6 degrees) can be attained, and $F_{NO}$ during zooming can be made constant.

Here, all the above-mentioned conditional expressions (1) to (7) are satisfied, while respective values are set as shown in Table 7.

Embodiment 3

Figure 3:
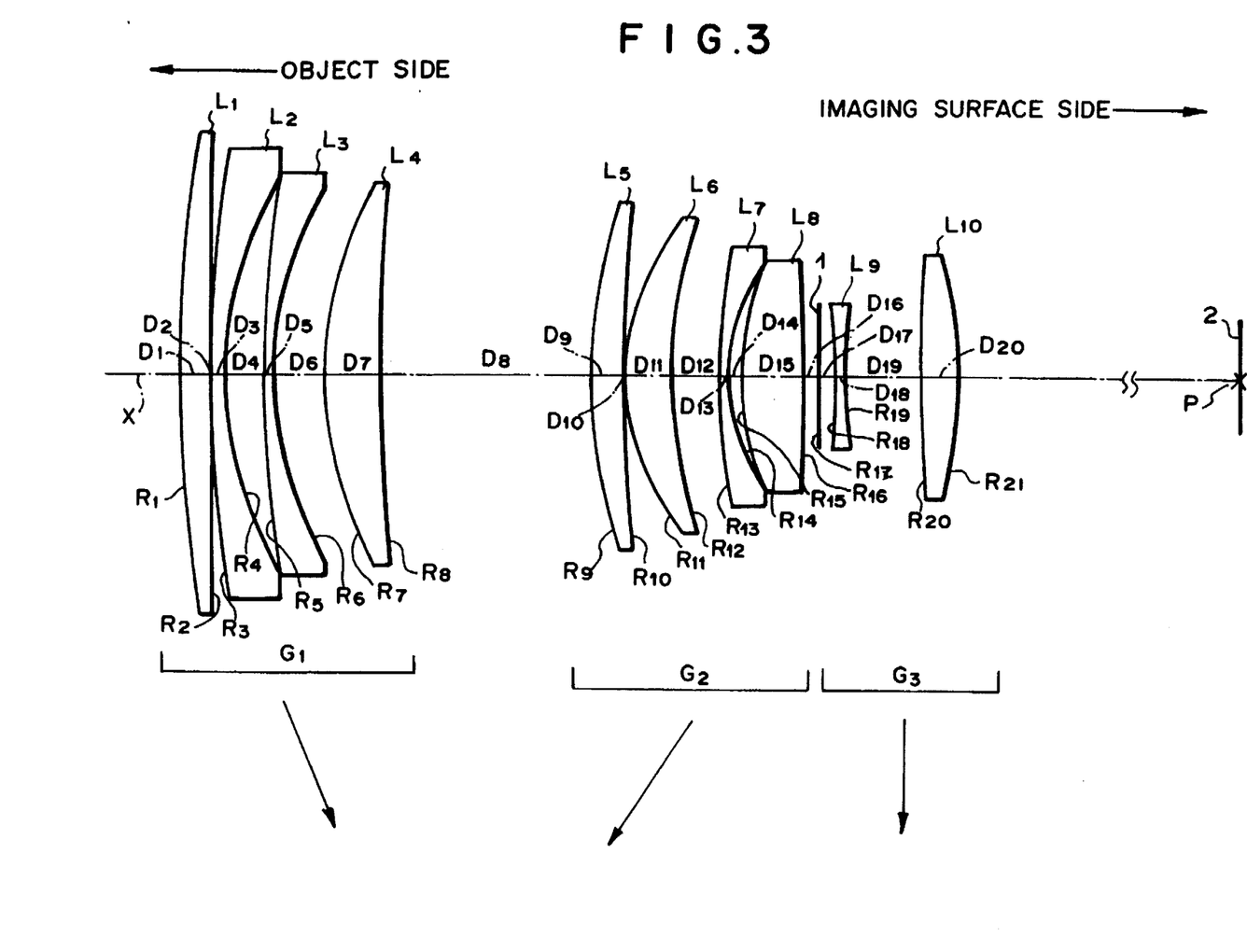
FIG. 3 is a schematic view showing a basic lens configuration in accordance with Embodiment 3 of the present invention.

In the following, the three-group lens of Embodiment 3 will be explained with reference to FIG. 3.

The lens of this embodiment has substantially the same lens configuration as that of the above-mentioned Embodiment 1 but mainly differs therefrom in that the first lens group $G_1$ is constituted by four lenses $L_1$ to $L_4$ which are respectively positive, negative, negative, and positive and that the second lens group $G_2$ is constituted by four lenses $L_5$ to $L_8$ which are respectively positive, positive, negative, and positive.

Table 5 (follows) shows radius of curvature R (mm) of each lens surface, center thickness of each lens and air gap between neighboring lenses D (mm), and refractive index N and Abbe number ν of each lens at d-line in the zoom lens in accordance with this embodiment.

Also, Table 6 (follows) shows values of $D_8$ and $D_{16}$ in the column for the axial spacing D in Table 5 and $F_{NO}$ at each position of the wide angle end (f=142.80 mm), medium range (f=167.29 mm), and telephoto end (f=196.00 mm).

Figure 10A:
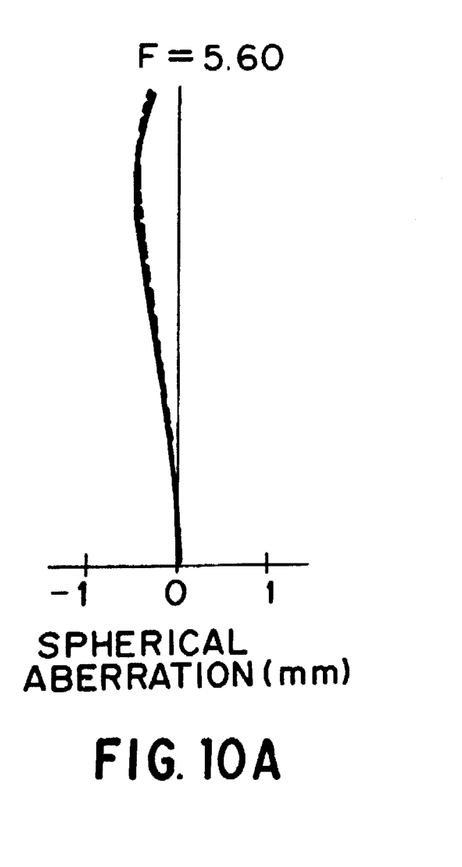
FIG. 10 is an aberration chart of the lens in accordance with Embodiment 3 at its wide angle end.
Figure 10B:
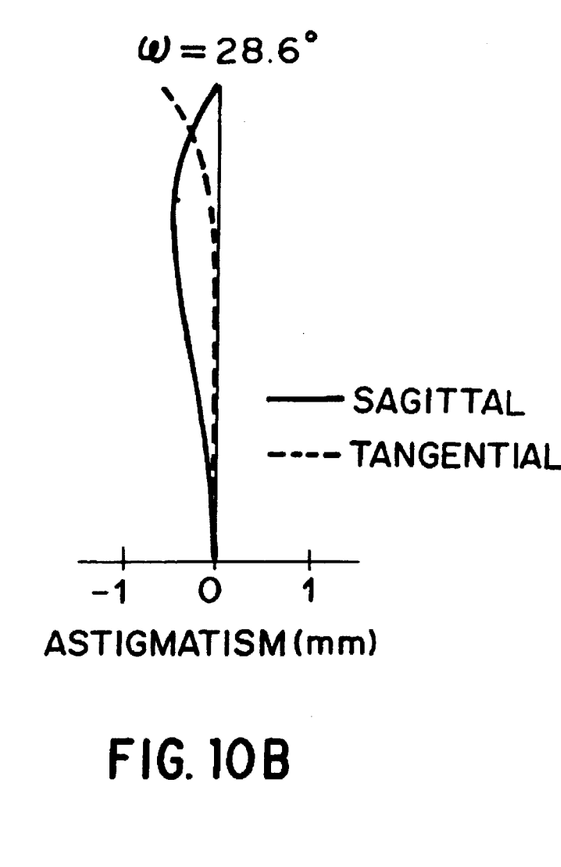
Figure 10C:
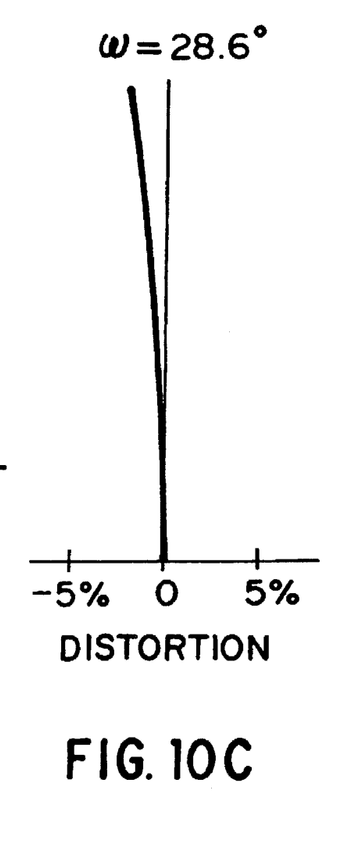
Figure 11A:
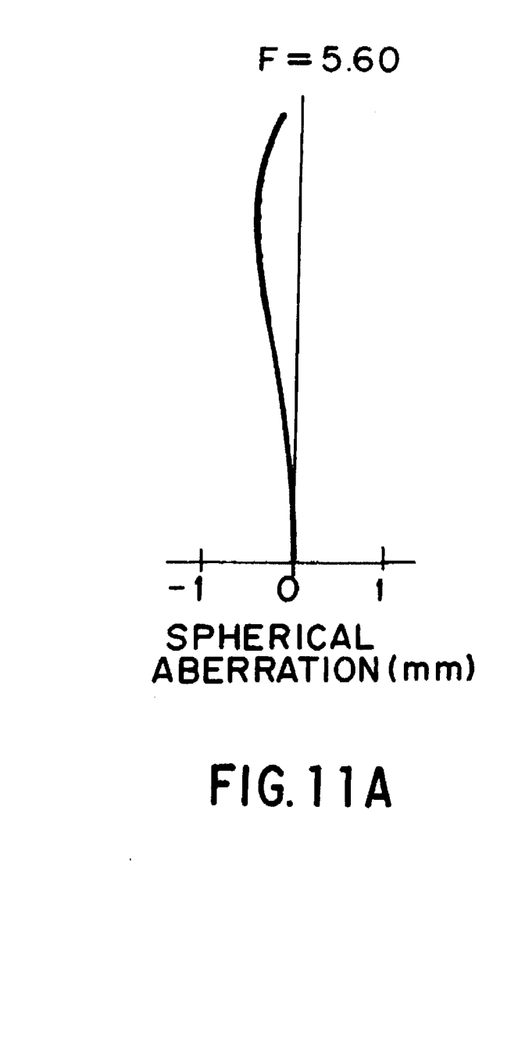
FIG. 11 is an aberration chart of the lens in accordance with Embodiment 3 at its medium range.
Figure 11B:
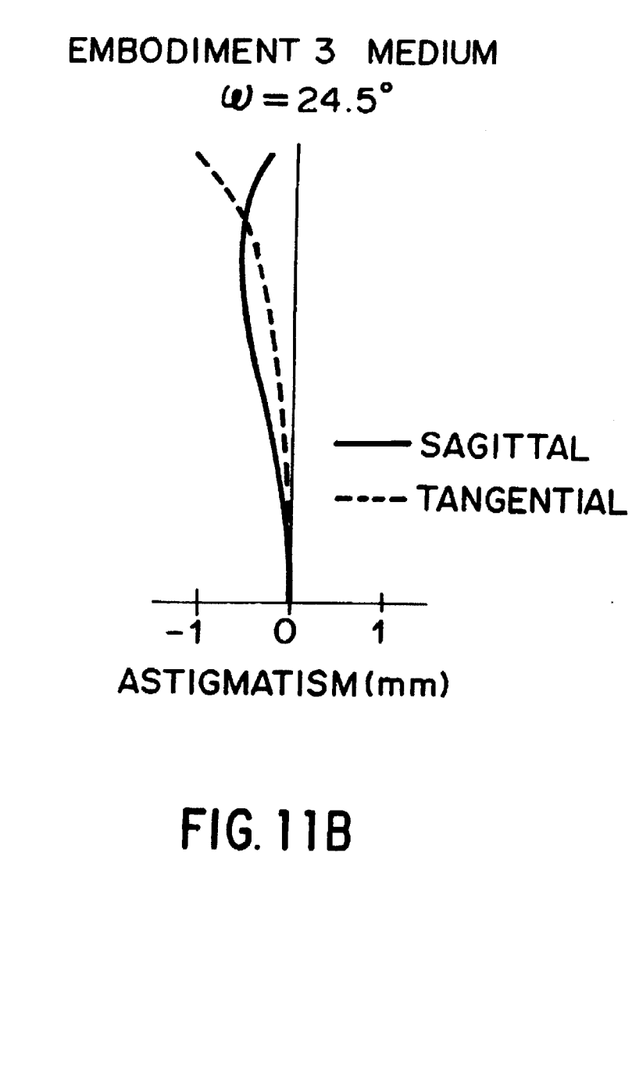
Figure 11C:
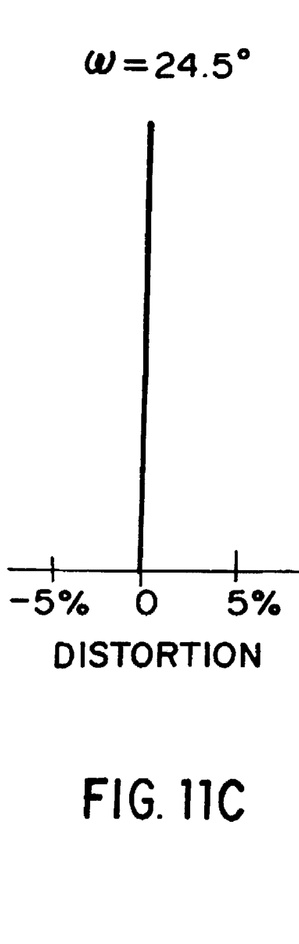
Figure 12A:
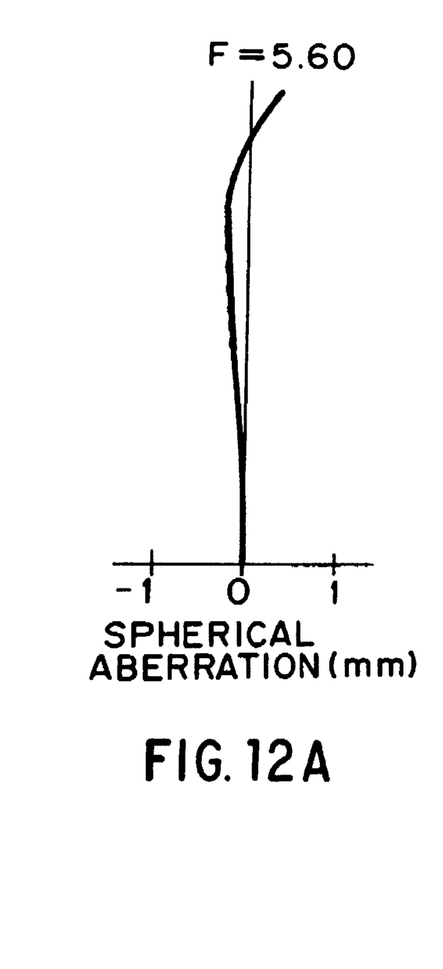
FIG. 12 is an aberration chart of the lens in accordance with Embodiment 3 at its telephoto end.
Figures 12B, 12C:
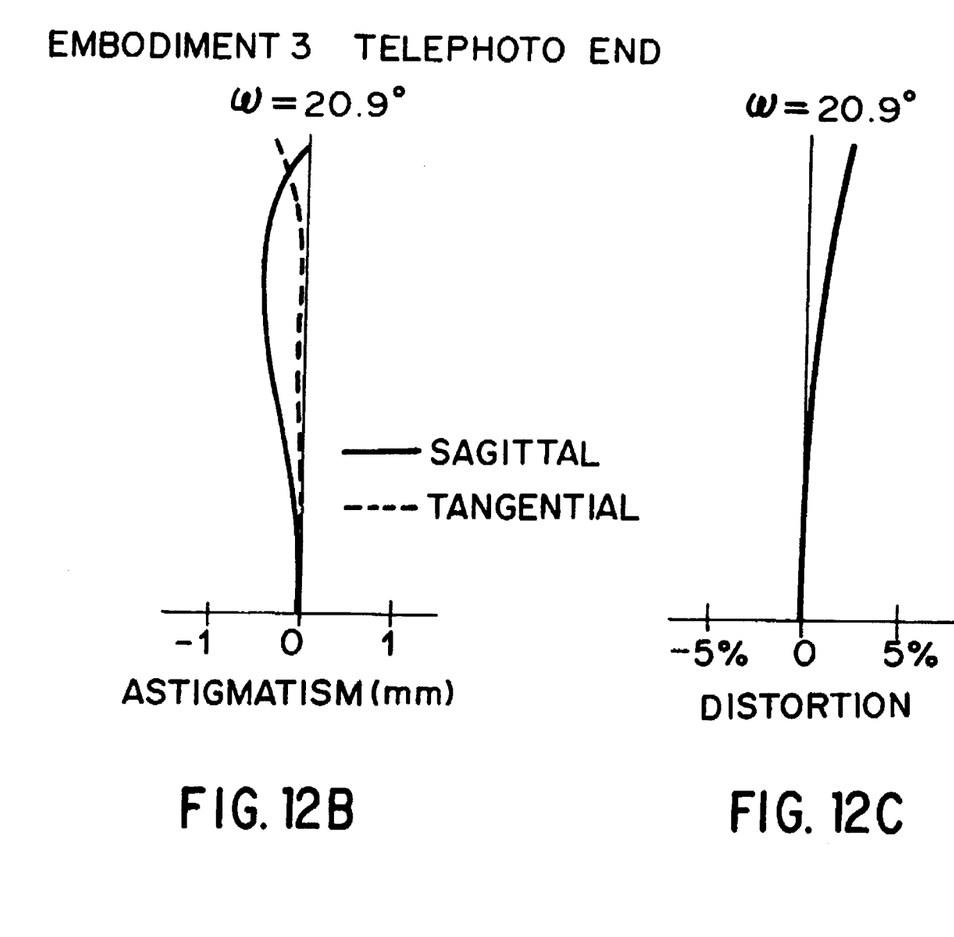

FIGS. 10, 11, and 12 are aberration chats showing various kinds of aberration of the zoom lens of this embodiment at the wide angle end, medium range, and telephoto end, respectively. As can be seen from FIGS. 10 to 12 and the above-mentioned Table 6, in accordance with the zoom lens of this embodiment, aberration can be favorably corrected throughout the zoom area, a wider angle (2ω=57.2 degrees) can be attained, and $F_{NO}$ during zooming can be made constant.

Here, all the above-mentioned conditional expressions (1) to (7) are satisfied, while respective values are set as shown in Table 7.

Without being restricted to the foregoing embodiments, the three-group zoom lens of the present invention can be configured in various manners. For example, the number and form of lenses constituting each lens group can be selected appropriately.

As explained in the foregoing, in the zoom lens of the present invention, while $F_{NO}$ is made constant at the time of varying power, various kinds of aberration can be made favorable, while a wide field angle, a high resolution, and a high contrast can be attained.

TABLE 1

| Surface No. | R | D | $N_d$ | $v_d$ |
|---|---|---|---|---|
| 1 | −335.450 | 3.00 | 1.75582 | 49.40 |
| 2 | 90.985 | 9.07 | | |
| 3 | 103.395 | 6.97 | 1.80500 | 24.75 |
| 4 | 228.134 | Variable | | |
| 5 | 88.869 | 12.00 | 1.80500 | 47.50 |
| 6 | 662.978 | 13.26 | | |
| 7 | 91.450 | 2.64 | 1.80500 | 24.75 |

TABLE 1-continued

| Surface No. | R | D | $N_d$ | $v_d$ |
|---|---|---|---|---|
| 8 | 33.386 | 0.20 | | |
| 9 | 33.513 | 12.00 | 1.62372 | 45.44 |
| 10 | −690.075 | Variable | | |
| 11 | 0.000 | 13.28 | | |
| 12 | −57.373 | 1.80 | 1.49116 | 62.86 |
| 13 | 136.409 | 3.25 | | |
| 14 | −130.991 | 12.00 | 1.80500 | 47.50 |
| 15 | −55.681 | | | |

TABLE 2

| | f = 142.79 | f = 167.29 | f = 196.00 |
|---|---|---|---|
| $D_4$ | 40.00 | 18.53 | 0.21 |
| $D_{10}$ | 3.00 | 11.89 | 22.30 |
| $F_{NO}$ | 5.60 | 5.60 | 5.60 |

TABLE 3

| Surface No. | R | D | $N_d$ | $v_d$ |
|---|---|---|---|---|
| 1 | 82.501 | 1.80 | 1.49000 | 56.88 |
| 2 | 56.408 | 20.03 | | |
| 3 | −143.662 | 1.80 | 1.73421 | 54.58 |
| 4 | 745.351 | 0.20 | | |
| 5 | 195.997 | 4.95 | 1.80500 | 33.82 |
| 6 | 477.592 | Variable | | |
| 7 | 101.692 | 8.23 | 1.75398 | 52.60 |
| 8 | −510.424 | 16.08 | | |
| 9 | 109.274 | 6.74 | 1.74340 | 53.66 |
| 10 | −96.595 | 0.20 | | |
| 11 | −91.329 | 4.70 | 1.80500 | 24.75 |
| 12 | −439.381 | Variable | | |
| 13 | 0.000 | 3.00 | | |
| 14 | −64.342 | 1.80 | 1.70618 | 45.55 |
| 15 | 109.036 | 5.53 | | |
| 16 | −112.221 | 5.33 | 1.80500 | 45.53 |
| 17 | −48.005 | | | |

TABLE 4

| | f = 142.10 | f = 166.48 | f = 195.04 |
|---|---|---|---|
| $D_6$ | 41.31 | 19.45 | 0.78 |
| $D_{12}$ | 3.00 | 8.14 | 14.16 |
| $F_{NO}$ | 5.60 | 5.60 | 5.60 |

TABLE 5

| Surface No. | R | D | $N_d$ | $v_d$ |
|---|---|---|---|---|
| 1 | 323.173 | 6.01 | 1.80501 | 24.75 |
| 2 | 3558.927 | 0.02 | | |
| 3 | 291.404 | 3.00 | 1.80500 | 47.50 |
| 4 | 76.390 | 7.93 | | |
| 5 | 250.961 | 1.80 | 1.80500 | 47.50 |
| 6 | 74.763 | 10.18 | | |
| 7 | 79.397 | 10.68 | 1.59485 | 38.52 |
| 8 | 413.720 | Variable | | |
| 9 | 118.080 | 6.04 | 1.76285 | 38.11 |
| 10 | 299.574 | 0.02 | | |
| 11 | 48.522 | 9.40 | 1.72296 | 49.58 |
| 12 | 94.221 | 9.47 | | |
| 13 | 136.250 | 1.80 | 1.80501 | 24.75 |
| 14 | 39.134 | 2.57 | | |
| 15 | 56.702 | 12.00 | 1.79138 | 48.86 |
| 16 | −110.558 | Variable | | |
| 17 | 0.000 | 3.00 | | |

TABLE 5-continued

| Surface No. | R | D | $N_d$ | $v_d$ |
|---|---|---|---|---|
| 18 | −151.910 | 1.80 | 1.80503 | 47.50 |
| 19 | 97.083 | 15.00 | | |
| 20 | 392.141 | 7.02 | 1.72188 | 48.74 |
| 21 | −96.955 | | | |

TABLE 6

| | f = 142.80 | f = 167.29 | f = 196.00 |
|---|---|---|---|
| $D_8$ | 41.82 | 19.37 | 0.21 |
| $D_{16}$ | 3.00 | 11.01 | 20.38 |
| $F_{NO}$ | 5.60 | 5.60 | 5.60 |

TABLE 7

| Expression | | Embodiment 1 | Embodiment 2 | Embodiment 3 |
|---|---|---|---|---|
| (1) | $G_1/f_w$ | −1.14 | −1.08 | −1.18 |
| (2) | $G_2/f_w$ | 0.59 | 0.47 | 0.61 |
| (3) | $G_3/f_w$ | −3.41 | −1.25 | −4.17 |
| (4) | $G_{1R}/f_w$ | 1.14 | 2.88 | 1.61 |
| (5) | $G_{2F}/f_w$ | 1.76 | 0.80 | 0.88 |
| (6) | $R_{2R}/f_w$ | −7.78 | −3.09 | −4.83 |
| (7) | $R_{3F}/f_w$ | −1.06 | −0.45 | −0.40 |

What is claimed is:

1. A three-group zoom lens comprising, successively from an object side, a negative first lens group, a positive second lens group, and a negative third lens group;

wherein, during varying power, said third lens group is made stationary while said first lens group and said second lens group are moved;

wherein a stop is disposed in said third lens group; and wherein the following conditional expressions (1) to (7) are satisfied:

(1) $-1.3 < G_1/f_w < -1.0$
(2) $0.4 < G_2/f_w < 0.7$
(3) $-4.8 < G_3/f_w < -1.0$
(4) $1.0 < G_{1R}/f_w < 3.0$
(5) $0.7 < G_{2F}/f_w < 1.9$
(6) $-8.5 < R_{2R}/f_w < -2.7$
(7) $-1.2 < R_{3F}/f_w < -0.3$ wherein $f_w$ is focal length at a wide angle end;

$G_1$ is focal length of the first lens group;

$G_2$ is focal length of the second lens group;

$G_3$ a is focal length of the third lens group;

$G_{1R}$ is focal length of a lens closest to an imaging surface side in the first lens group;

$G_{2F}$ is focal length of a lens closest to the object side in the second lens group, $R_{2R}$ is radius of curvature, on the imaging surface side, of a lens closest to the imaging surface side in the second lens group; and $R_{3F}$ is radius of curvature, on the object side, of a lens closest to the object side in the third lens group.

* * * * *